A. D. SCOTT.
WINDING MACHINE.
APPLICATION FILED APR. 15, 1910.
1,047,844.
Patented Dec. 17, 1912.
5 SHEETS—SHEET 1.
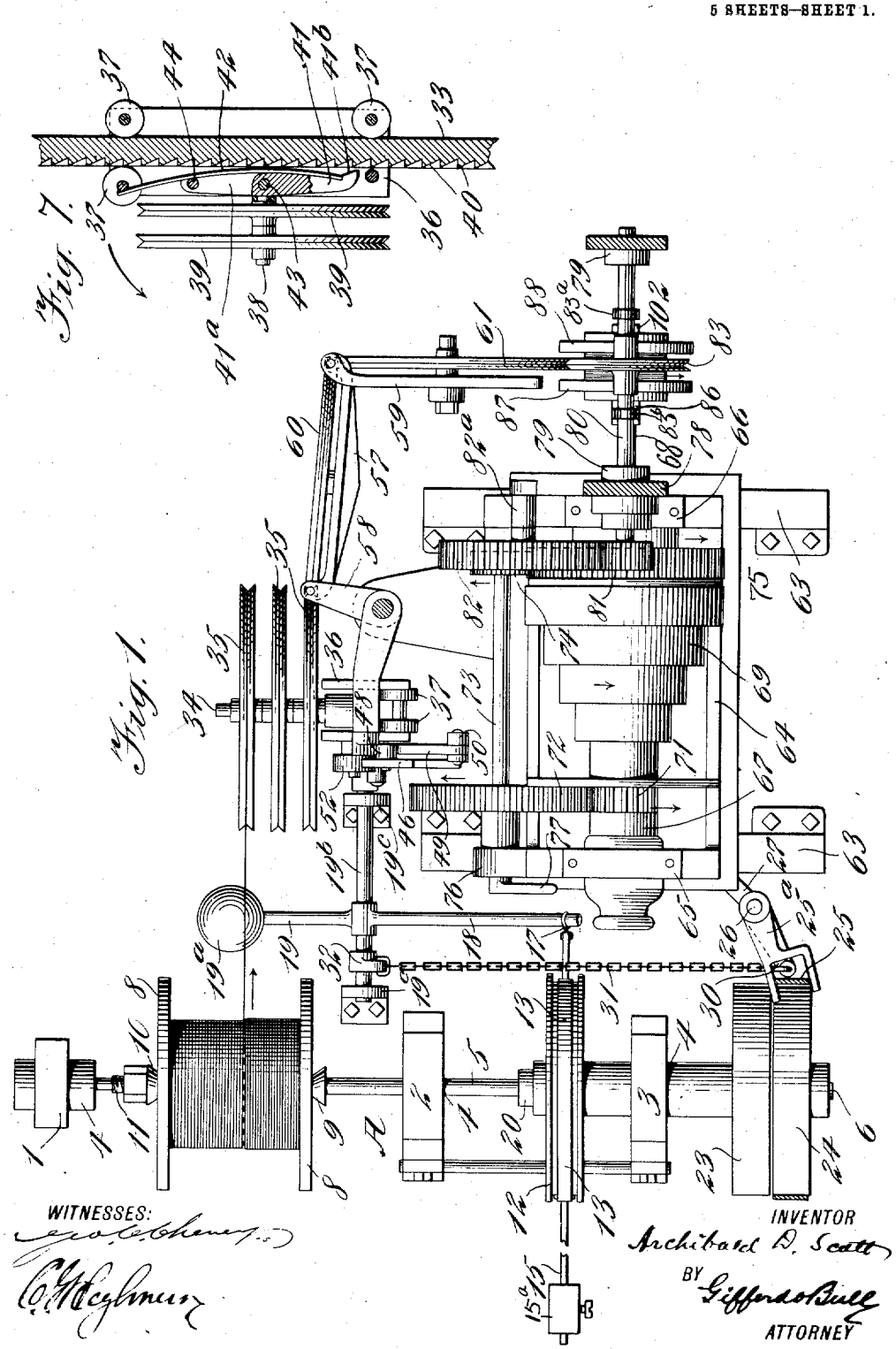
INVENTOR
Archibald D. Scott
BY Gifford & Bull
ATTORNEY

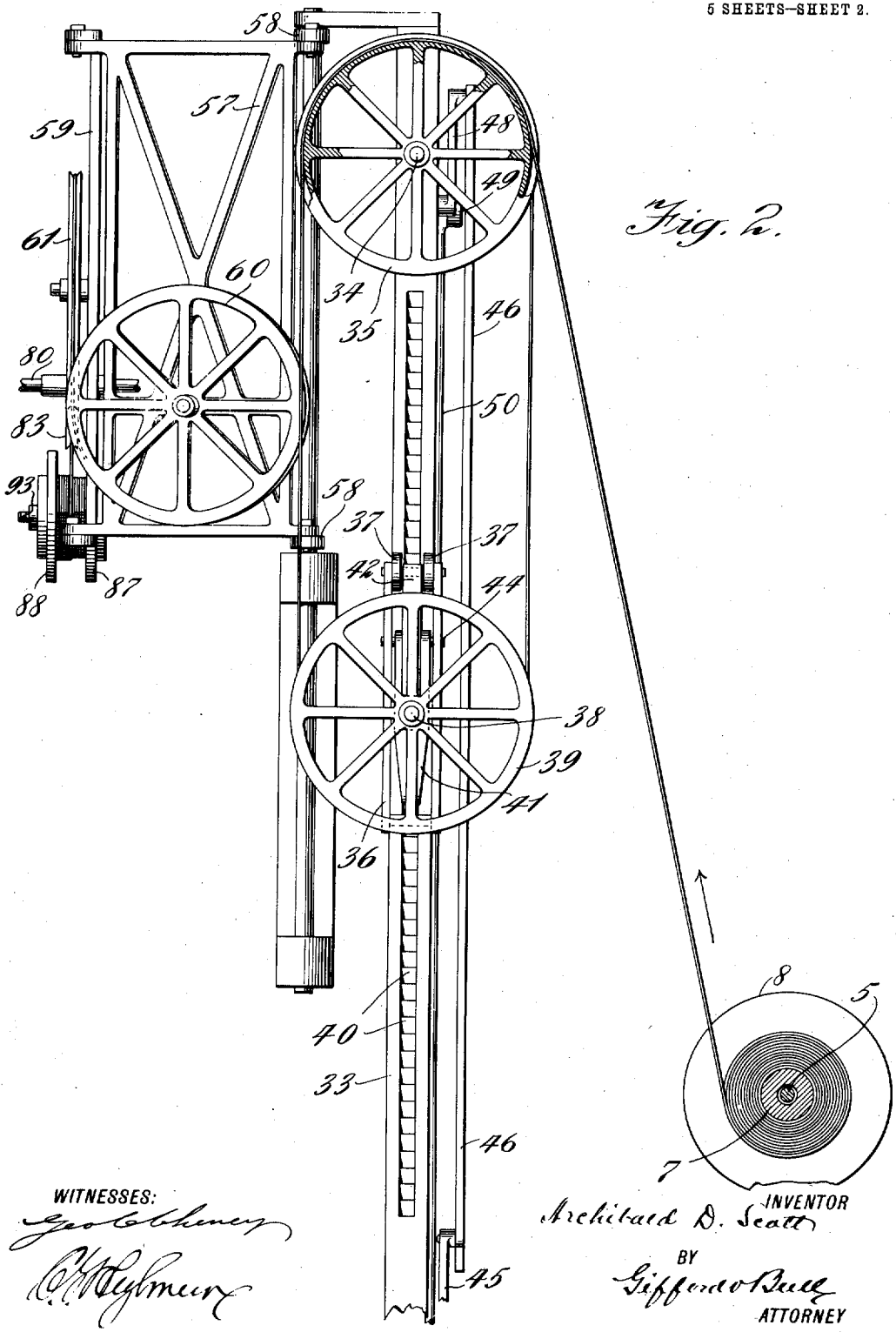

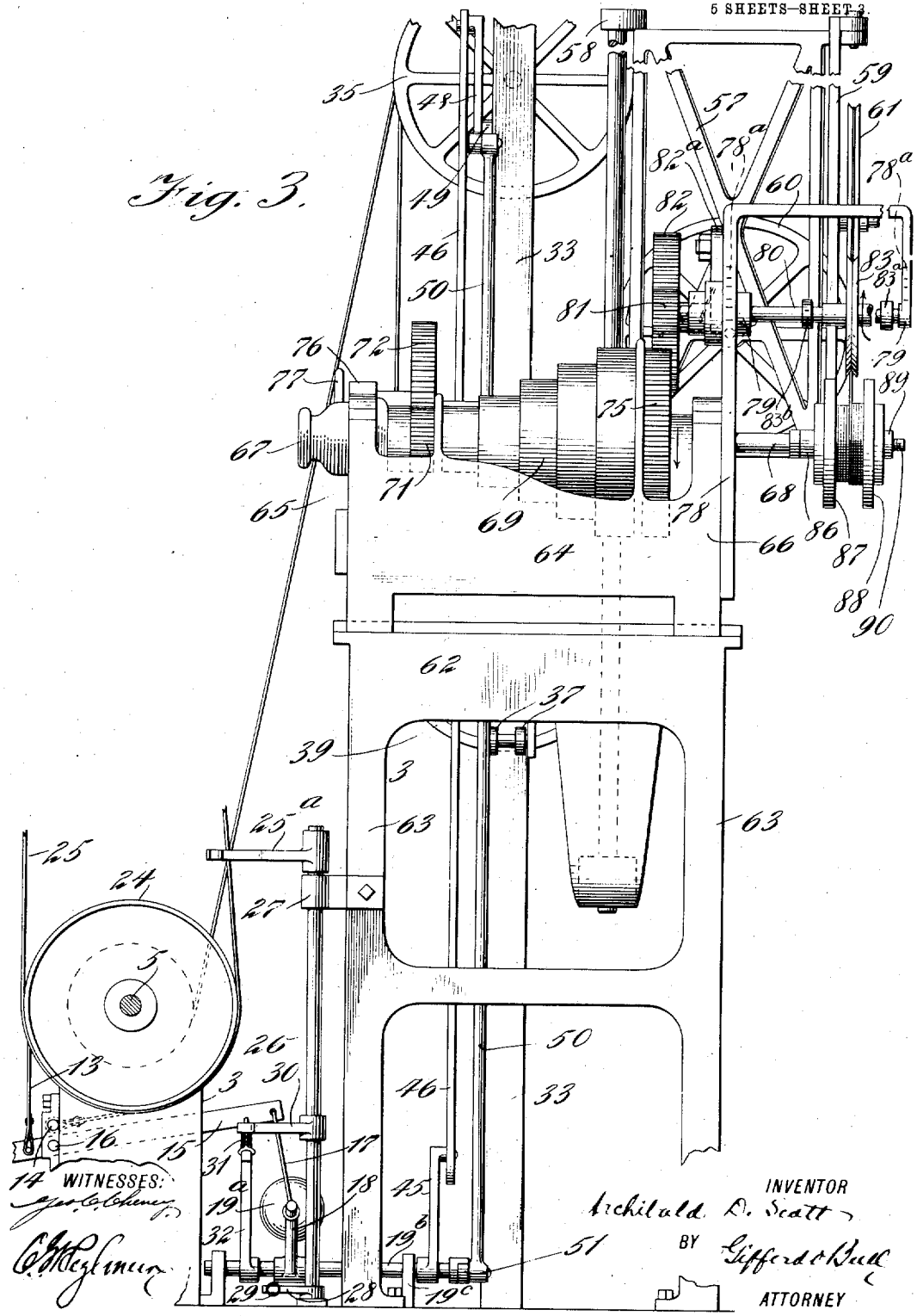

A. D. SCOTT.
WINDING MACHINE.
APPLICATION FILED APR. 15, 1910.
1,047,844.
Patented Dec. 17, 1912.
5 SHEETS—SHEET 4.
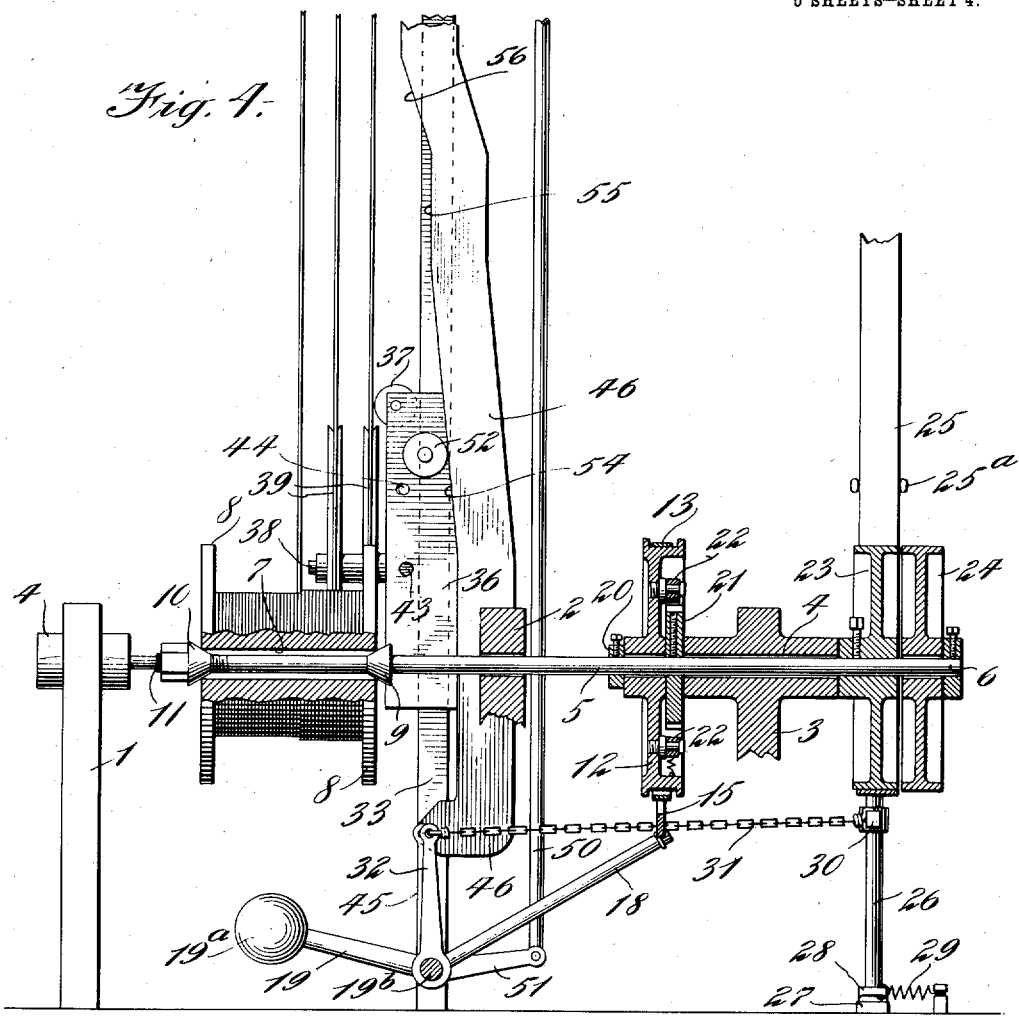
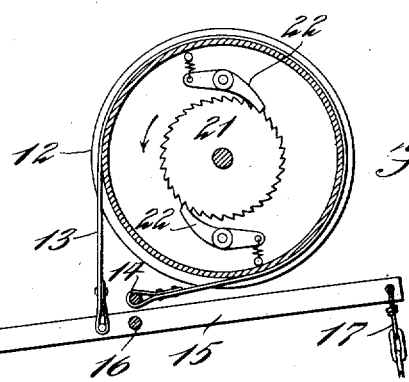
WITNESSES:
INVENTOR
Archibald D. Scott
BY
Gifford Bull
ATTORNEY

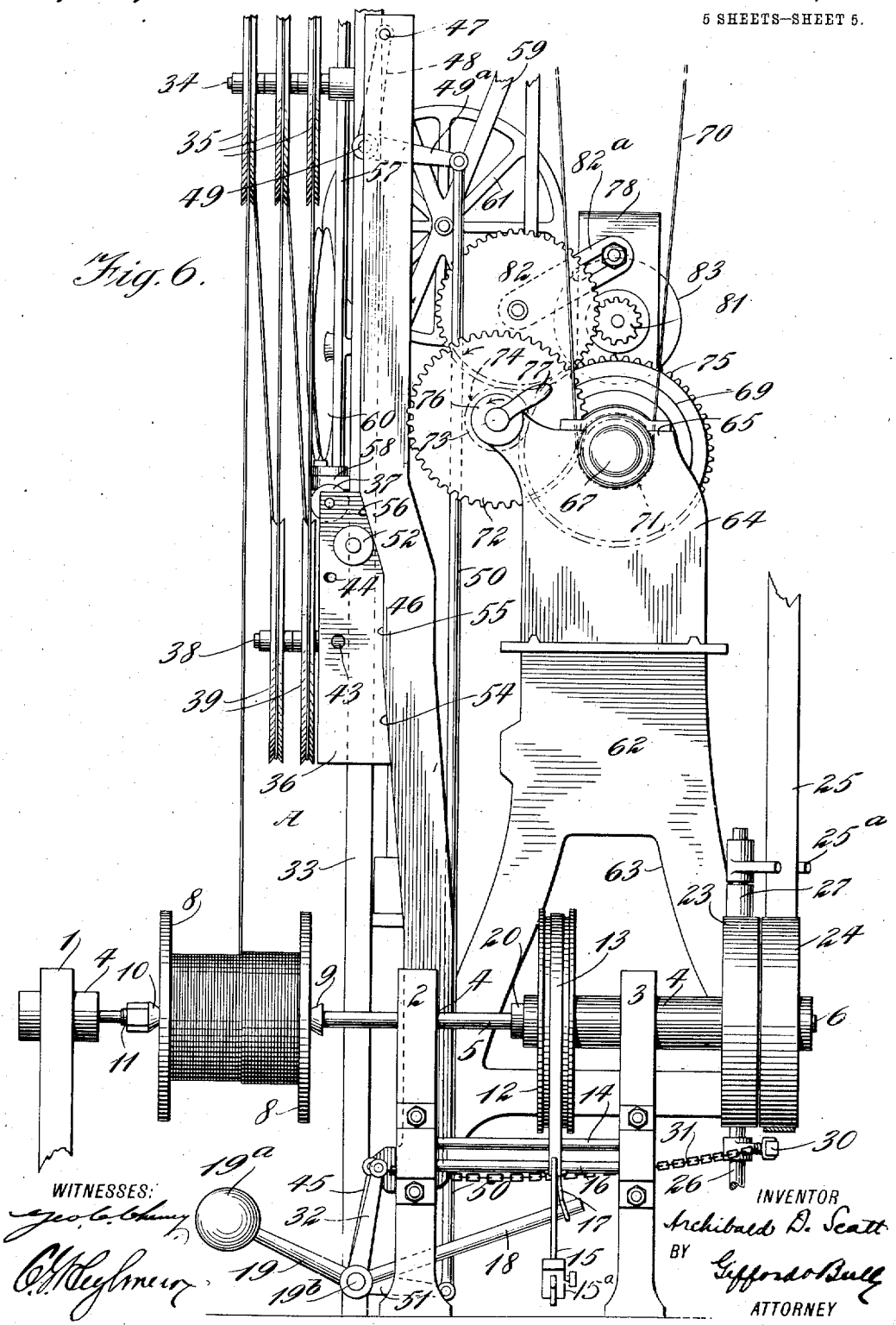

UNITED STATES PATENT OFFICE.

ARCHIBALD D. SCOTT, OF JERSEY CITY, NEW JERSEY, ASSIGNOR TO VARLEY DUPLEX MAGNET COMPANY, A CORPORATION OF NEW JERSEY.

WINDING-MACHINE.

1,047,844.   Specification of Letters Patent.   Patented Dec. 17, 1912.

Application filed April 15, 1910. Serial No. 555,736.

*To all whom it may concern:*

Be it known that I, ARCHIBALD D. SCOTT, a citizen of the United States, residing at Jersey City, in the county of Hudson and State of New Jersey, have invented certain new and useful Improvements in Winding-Machines, of which the following is a specification.

My invention relates to new and useful improvements in winding machines and more particularly to machines for winding wire into a coil or winding for use in connection with electrical apparatus, for example, electro-magnets or the windings for field magnets of motors or dynamos.

The primary object of the invention is to provide a machine for the purpose described which will be comparatively simple in construction, and efficient in operation.

A further object is to provide improved and simplified means for regulating the supply and tension of wire, or other strand being wound, in accordance with the amount demanded by the winding operation.

Other objects will appear as the description hereinafter progresses.

The invention consists in the construction and arrangement of parts and their aggroupment in operative combination to be fully described hereinafter, and the novelty of which will be particularly pointed out and distinctly claimed.

I have fully and clearly illustrated my invention in the accompanying drawings to be taken as a part of this description, and wherein:

Figure 1 is a plan view partly in horizontal section of a machine embodying my present invention. Fig. 2 is a side elevation of the strand guiding mechanism, and the feed-regulating mechanism. Fig. 3 is a side elevation of the machine taken from the side opposite to that shown in Fig. 2. Fig. 4 is a rear elevation partly in section of the supply mechanism and part of the means for regulating the supply of the strand furnished by the supply mechanism. Fig. 5 is a detail sectional view of the supply spool shaft and the brake therefor. Fig. 6 is a view in rear elevation of the complete machine. Fig. 7 is a detail sectional view.

Before entering into a detailed description of the machine employed for illustrating my invention, I would state that the same is shown for the purposes of this application as embodying a supply mechanism, a winding mechanism, a strand guide for guiding the strand to the winding mechanism, and means for regulating the amount of strand furnished to the winding mechanism from the supply mechanism.

Referring to the drawings I will proceed to describe the embodiment of my invention therein shown, first describing what I have termed the supply mechanism.

Calling attention to Figs. 1, 3, 4 and 6, the supply spool mechanism is shown generally at A, and 1, 2 and 3 designate standards of any suitable design firmly secured to a base such as a floor, and spaced apart from each other as shown, each standard having a journal bearing 4 adjacent the upper end thereof, said bearings being in horizontal alinement. In these alining bearings is journaled a horizontally disposed supply spool shaft 5, the same bridging the space between the standards and having one end projecting, as at 6, beyond or outside the bearing, 4. Mounted upon the shaft 5 between the standards 1 and 2 is the supply spool consisting of a core 7 and flanges 8, said spool being secured on the shaft by means of a fixed abutment or cone-collar 9 against which the spool is held by means of an adjustable cone-collar 10 threaded onto the shaft as at 11. The adjustable collar 10 is adjusted so that the spool is forced against the collar 9 and thereby rigidly clamped to the shaft between said cone-collars, whereby said spool and shaft turn together. Arranged on the shaft 5 between the standards 2 and 3 is a brake wheel 12 engaged by a hand brake 13, one end of which is secured at a fixed point 14 off the shaft and wheel, and the other end of which is connected to a lever 15 fulcrumed at 16, said lever being connected by a chain 17 with one arm 18 of an intermediately fulcrumed lever, the opposite arm 19 of which carries a weight 19$^a$ the function of which will be presently set forth. On the end of the lever 15 opposite to the chain 17 is a weight 15$^a$ which serves to throw the said lever to apply the brake band 13 to the brake wheel 12. This lever 18, 19 is rigid with a rock shaft 19$^b$ journaled in bearings 19$^c$, said shaft serving as the fulcrum for the lever. The brake wheel is held against movement endwise on the shaft by a limiting collar 20, and the adjacent bearing 4, and it will be noted that said wheel is not directly connected to the shaft but is capable of free movement about the same in one direction although it is positively connected thereto when the shaft is revolved in the opposite direction. The connection providing for this operation is provided by rigidly mounting on the shaft a ratchet disk 21, see Fig. 5, the teeth of which are engaged by pawls 22 carried by the brake wheel. It will be seen that by this arrangement the shaft, when turning in one direction, as, for instance, that indicated by the arrow, it will be locked to the brake wheel so that the rotation of the shaft will be braked by the brake band, but the shaft, when turned in the other direction, is free to rotate without affecting the brake wheel or being subjected to any braking action. On the projecting end 6 of the shaft 5, adjacent each other, are mounted a fixed pulley 23 and a loose pulley 24 adapted to be driven by an endless belt 25 connected to any suitable source of power. During the normal running of the machine, this endless belt travels on the loose pulley without affecting the shaft, but is adapted to be shifted to the fixed pulley, under conditions to be set forth hereinafter, to revolve the shaft positively. For this purpose I provide a pivoted belt shifting arm $25^a$ carried at the upper end of a vertical rotary bar 26 journaled in brackets 27 carried by the main frame of the machine, said bar 26 having an arm 28 engaged by a spring 29 to throw the bar so as to shift the belt and maintain the same normally on the loose pulley. Also projecting from the bar 26 is an arm 30 connected by a chain 31 to an arm 32 connected to the rock shaft $19^b$ carrying the weighted bell crank lever before described. The arrangement is such that the shaft and supply spool normally run free under the pull of the strand as it is taken up by the winding mechanism and the brake is set to retard the rotation of the spool to keep the strand taut and prevent the spool from overrunning. Under certain conditions it is desired to have the revolution of the shaft reversed to take up the wire on the supply spool and the lever 19 is then thrown down to its full extent to stop the further revolution of the shaft, this movement of the lever operating the belt shifter to shift the belt from the loose to the fast pulley on the spool shaft whereby the revolution of the latter is reversed.

I will now proceed to describe the means for regulating the amount of the strand to be paid out from the supply mechamnism in accordance with the amount taken up by the winding mechanism, and coöperating with the brake and belt shifting means hitherto described for controlling the revolution of the supply spool.

Located preferably adjacent the supply spool is a vertically disposed guide-post 33 from the upper end of which projects a horizontal stud shaft 34 upon which are loosely mounted for free rotation a plurality of circumferentially grooved wheels or pulleys 35, in this instance three in number, and arranged to revolve in parallel vertical planes. Slidably mounted on the guide-post 33 is a carriage 36 having running wheels 37 engaging opposite sides of said post to provide for a free and smooth movement of the carriage on the guide-post. On this carriage is a horizontally disposed stud shaft 38 on which are rotatably mounted a plurality of grooved pulleys or wheels 39, in this instance two in number. The face of the post 33 next the wheel bearing side of the carriage is formed with a line of upwardly directed ratchet teeth 40 located to be engaged by a pivotal pawl 41 carried by the carriage. The pawl is preferably pivoted at a point intermediate its ends on a pin 43, the rear end of the pawl having a projection $41^a$. The spring 42 has one end secured to the pawl adjacent its tooth $41^b$ and engages the pin 44 on the projection $41^a$, the end of the spring opposite to that secured to the pawl engaging a fixed part of the carriage so that the pawl is normally urged by the spring 42 toward the ratchet teeth on the guide-post but does not engage said teeth during the normal reciprocation of the carriage on the post. The pin 43, besides serving as the pivot for the pawl 41, serves also to support the stud shaft 38 upon which the wheels 39 are mounted, the arrangement being such that said wheels are hingedly connected with the carriage. The arrangement of the wheels 39 on the supporting carriage and their connection with the pivot 43 for the pawl is such that should the wire break and permit the carriage to drop, the spring operates to throw the pawl into engagement with the teeth on the guide-post, the stud shaft carrying the wheels 39 swinging downwardly on its hinged connection. By this arrangement it will be seen that while the winding operation is in progress and the strand of wire is intact, the wheels 39 and their stud shaft will be maintained in substantial horizontal position, and will hold the pawl out of engagement with the teeth against the tension of the spring 42, the pawl only being effective to stop the fall of the carriage when a break in the wire frees the wheels 39 to release the spring 42. The wire strand coming from the supply spool is first passed over the outer wheel 35 on the guide-post 33 and is then passed under the outer wheel on the carriage, over the middle wheel on the post, under the inner one on the carriage, over the inner one on the post, whence it passes to the winding mechanism, to be presently described. It is obvious that during the winding operation the strand is subjected to pull by the winding mechanism and this pull and the amount of wire wound is employed to act on the movable carriage to regulate the feed of wire from the supply spool. During this operation the carriage moves up and down on the guide-post, being pulled up on the post by the wire when the demand of the winding mechanism is great, the upward movement being employed to operate the supply spool to let off more wire, while, when the demand is reduced, the carriage drops or moves down to actuate the spool controlling elements to reduce the amount of the strand paid out. This is accomplished by mechanism which I will now describe.

Projecting upward from the rock shaft 19$^b$ and rigid therewith is an arm 45 to the free end of which is connected the lower end portion of a transmission member 46 consisting of a vertically disposed bar located adjacent the guide-post and the parts associated therewith, the upper end of said bar extending beyond the normal path of movement of the movable carriage, and having its upper end portion loosely connected as at 47 to a vertical arm 48 of a bell-crank lever fulcrumed at 49 on the guide-post. The other arm 49$^a$ of this bell-crank lever is connected by a connecting bar 50 with a lever arm 51 rigidly connected to the rock shaft 19$^b$, said arm 51 projecting at a substantial right angle to the arm 45. The transmission bar 46 above described is normally urged toward the carriage 36 under influence of the weight 19$^a$, and normally engages along one edge with a running roller 52, carried by the carriage 36. This bar 46 is so formed on the face engaging the carriage that its position is changed by the weight, or other suitable means, according to the position of the carriage as the latter moves up and down, so that the let-off of the supply spool is regulated, or its revolution reversed, to take up the wire. For this purpose the bar 36 is formed with an intermediate inclined face 54 inclining upwardly and outward toward the carriage, a straight portion 55 just above the said inclined portion, and a second outwardly inclined portion 56 above the said straight portion. By this arrangement and construction, under normal working conditions the carriage takes a position on the guide-post with the roller 52 in engagement with the face 56 on the bar 46. Should the winding spool take up the wire carried by the carriage wheels and the wheels 35 sufficiently to raise the carriage so as to raise the roller 52 on the inclined surface 56, the bar 46 will be moved back. This movement of the bar 46 will raise the weighted brake lever and release the brake on the supply spool shaft to permit the spool shaft to revolve more freely and pay out more wire to the running wheels 35 and 39, the weight of the carriage upon which said wheels 39 are mounted serving to pull the wire from the supply spool, and, as soon as the supply has been increased to exceed the demand of the winding core, the carriage permits the bar 46 to move forward and thereby permits the brake to be set to retard the rotation of the supply spool. If for any reason the carriage should drop below its normal position so as to carry too much wire, the roller 52 on the carriage will take a position somewhere along the straight surface 55 on the bar 46, which will permit the weight 19$^a$ to throw the brake to grip the brake wheel to immediately stop the shaft. If the carriage should fall low enough to permit the roller 32 to engage the inclined surface 54, the weight 19$^a$ will actuate the belt shifter to shift the belt from the loose to the fixed pulley on said shaft. This results in the revolution of the shaft 5 being reversed to cause the supply spool to take up the excess wire and raise the carriage and roll to the straight part 55 of the bar 46. The slipping connection between the brake wheel and the shaft 5 will permit the reversal of the shaft and spool as soon as the belt is shifted from the loose to the fixed pulley. It will thus be seen that the movable carriage and the wheels 35 on the guide-post constitute a supply source of wire for the winding mechanism and that the wire is taken off the supply spool and delivered to said wheels and carriage under the control of the carriage. From the inner wheel 35 on the vertical guide-post the strand of wire passes to a guiding crane, the movements of this crane being under control of the strand being wound. This crane comprises a rectangular frame 57 pivoted at one side to brackets 58, 58 on the frame of the winding mechanism, said frame 57 being arranged in a vertical plane to swing horizontally, and to the free or swinging end of this frame is pivoted a second frame 59 also arranged in a vertical plane to swing horizontally. The frame 57 carries a revoluble guide-wheel 60 having a channeled periphery, said wheel being arranged to revolve in a vertical plane and so that its periphery is located on a common tangent with the inner guide-wheel 35. The frame 59 also carries a vertically disposed grooved guiding wheel 61 located in a vertical plane at an angle to that occupied by wheel 60, but with its periphery on a common tangent with said wheel 60.

The winding mechanism proper will now be described.

Referring particularly to Figs. 1, 3 and 6, 62 designates a stand bed supported on legs or standards 63, upon which the winding mechanism is supported. Secured upon this bed 62 is a bearing frame 64 having vertical spaced bearings 65, 66 in which are journaled the respective ends of a shaft 67 carrying at one end a spindle 68 upon which the winding mandrel to be described hereinafter is mounted. Loosely mounted on this shaft to turn thereon is a cone pulley 69 adapted to be driven by any suitable power belt as shown at 70 in Fig. 6. Also mounted on the shaft 67 and connected to the cone pulley so as to turn therewith is a pinion 71 in mesh with a larger gear 72 carried by a shaft 73 journaled on the bed in the rear of the shaft 67 and running parallel thereto, as shown in Figs. 1 and 6. On the opposite end of the shaft 73 from that carrying the gear 72 is a small pinion 74 which in turn meshes with a larger gear 75 mounted on and rigidly connected to said shaft 67. By this arrangement the shaft 67 is driven from the cone pulley by means of the pinion 71, gear 72, shaft 73, pinion 74 and gear 75. The gear 75 normally runs independently of the cone pulley, but in the event it is desired to drive the winding spindle directly from the pulley, means is provided for disconnecting the cone pulley from the shaft 73. A simple manner of accomplishing this result consists in mounting the shaft 73 in eccentric bearings 76, as shown in Fig. 1 operable by means of handles 77, 77 to swing the shaft 73 far enough away from the shaft 67 to disengage the gears carried by the shafts. The large gear 75 is then bolted to the pulley by suitable fastening bolts and it will be apparent that the spindle will then be driven directly by the cone pulley. Upon one side of the bearing standard 66 and arranged to overhang the winding spindle 68 is a bracket 78 having bearings 79 adjustable vertically, in which turns a horizontally disposed shaft 80 parallel to the winding spindle. One end of this shaft 80 projects over the gear 75 and carries on said end a pinion 81 adapted to be placed in gear with an adjustable gear 82 mounted on a movable bracket 82ª arranged to be bolted to the standard 66 so that the gears carried by said bracket will transmit motion from the gear 75 to the pinion 81. When this train of gears is in use the shaft 80 is driven in the same direction as the shaft 67. The shaft 80 has loosely mounted thereon a grooved guide wheel 83 for guiding the strand from the swinging crane to the winding bobbin, said wheel turning fully on said shaft in the direction of the arrow shown in Fig. 3, and at the same time sliding lengthwise of the shaft as the strand progresses along the bobbin from end to end of the latter. When heavy wires are being wound the shaft 80 is not driven but when light wires are being wound said shaft is driven by said train of gears 82 in a direction opposite to that of the revolution of the wheel 83, so as to reduce the friction between said wheel and shaft so that the wheel will move lengthwise of the shaft more freely. The shaft 80 is adjustable toward and away from the winding mandrel or form, so that the guide wheel 83 thereon may be brought as close as possible to the surface of the winding, to make the length of the strand between the guide wheel 83 and the winding as short as possible. In order to provide for this adjustment I form in the vertical arms of the bracket 78 a plurality of alining openings 78ª in any one of which the shaft 80 may be mounted.

Any suitable core or mandrel may be employed upon which to form the winding, but I have shown the same, for the purposes of this application, as consisting of a core 86 having spaced face-plates 87, 88, the latter of which is preferably removable in order to permit the removal of the winding from the core after it has been completed. This detachable face-plate is held in place on the core by means of a removable nut 89 threaded onto the threaded extension 90 of the mandrel shaft 68.

The construction and arrangement of parts being as above described, the operation of the machine is as follows: A supply spool with wire of the desired character and gage is mounted on the spool shaft 5, and the wire is pulled therefrom and passed around the upper outer wheel 35, and then alternately around the lower carriage wheels and the remaining wheels on the stud 34, whence it is passed under the wheel 60, and over the wheel 61 on the crane, and under the guide-wheel to the winding mandrel where it is secured. The end of the wire secured to or engaged with the mandrel is placed in close engagement with the face plate, and the driving means for the mandrel is then set in operation to rotate the mandrel. The rotation of the mandrel will wind the wire thereon, the latter being started by the guides to take a proper spiral on the mandrel to make a smooth and even foundation layer to serve as a guide for the remaining levers to be formed. During the winding the strand is wound on the mandrel from end to end back and forth, and during these traversing movements the guide wheel 83 moves back and forth along its shaft 80 to guide the strand to the mandrel in a straight line. The swinging crane carrying the wheels 60, 61 also moves in unison with the guide spool so that the strand is at all times guided in a straight line to the said spool and all kinking or deflections in the wire is obviated. The guide spool and crane move back and forth at all times under the influence of the strand being wound. In other words, the guiding movement of the spool and crane is not determined by any operating mechanism but by the movements of the strand as it is wound upon the mandrel. The winding operation being established, the strand for the mandrel is drawn from the supply carried by the wheels 35 on the guide post, and the wheels on the carriage 36. As the strand is taken up by the mandrel the carriage 36 is raised until the wheel 52 in the carriage strikes the inclined cam face 56 which throws the cam bar 46 to the right, as the same is illustrated in Fig. 4. This movement of the cam bar, through the lever connections releases the brake which normally exerts its pressure on the supply spool shaft, and the gravitation of the carriage 36 will pull more wire from the freely movable supply spool. This operation continues until the carriage 36 drops until its roller 52 again reaches the face 55 when the brake will again be applied and the free rotation of the supply spool stopped or retarded by the brake.

During the operation of the machine it sometimes happens that it is necessary to reverse the revolution of the mandrel in order to arrange the turns thereon, or to remove some defect in the wire which might cause an imperfect winding. When the mandrel is reversed it will be obvious that some of the wire will unwind from the mandrel back onto the wheels 35, 39 constituting the supply control mechanism, and in this case the excess of wire carried by said wheels 35, 39 will permit the descent of the carriage 36, the roller 52 thereon passing from the inclined part 56 of the bar 46 onto the straight face 55 of the said bar, whereby the bar will move to the left as shown in Figs. 4 and 6, and permit the brake to be set to prevent the further revolution of the supply spool to feed wire to the wheels 35, 39. Should the amount of wire unwound from the mandrel onto the wheels 35, 39 of the supply controlling mechanism be sufficient to permit the carriage to drop below the straight face 55 of the bar 46 onto the inclined face 54, said bar will move to the left sufficiently to shift the belt from the loose to the fixed pulley and thereby reverse the revolution of the supply spool to take up the excess of wire paid off from the mandrel.

In order that the guide wheel 83 will not be permitted to override the inner faces of the end plates and cause the end turns to pile up against the end plates I limit the movement of said wheel on the shaft by means of collars 83$^a$, 83$^b$ fixed to the shaft and so located thereon that the guide wheel will be stopped before the groove therein gets in line with the inner face of the end plates. These collars are adjustable along the shaft so that the extent of movement of the wheel may be regulated according to the length of the coil being wound.

Having thus described my invention, what I claim as new and desire to secure by Letters Patent is:—

1. In a winding machine, the combination of a revolving coil receiver, a sliding member movable by the material being wound, a supply controlling means for the supply, and a cam bar engaged by said sliding member throughout its movement and operated thereby for actuating the controlling means.

2. In a winding machine, the combination of a revolving coil receiver, a sliding member movable by the material being wound, a supply controlling means for the supply, and a cam bar in engagement with the sliding member throughout the sliding movements thereof, and connections between the bar and said controlling means whereby the latter is operated.

3. In a winding machine, the combination of a revolving coil receiver, a sliding member movable by the material being wound, a supply spool shaft, controlling means for the shaft, including a retarder and a reversing mechanism, and a cam engaged by the sliding member, said cam having a plurality of faces, one of which is engaged by said sliding member to control the retarder and the other of which is engaged by said member to control the reversing mechanism.

4. In a winding machine, a winding core, a supply spool, means for retarding the rotation of said spool, means for reversing the rotation of the spool, means for applying the retarding means, means for holding the retarder ineffective, a member movable by the strand being wound, and an operating member connected to said holding means and reversing means, and constructed to be moved by said movable member to first release the retarder and subsequently operate the reversing means.

5. In a winding machine, the combination of a revolving coil receiver, a sliding member movable by the material being wound, a supply spool shaft, controlling means for the shaft, including a retarder and a reversing mechanism, a vertical guide, a vertical laterally movable cam bar arranged in normal engagement with said sliding member, and connections between said cam bar, and said retarder and reversing mechanism whereby the movement of the sliding member moves the cam bar laterally to operate the retarder and reversing means.

6. In a winding machine, in combination, a revoluble coil receiver, a double-jointed swinging crane carrying a guiding wheel movable in a line parallel to the axis of revolution of the receiver, and a rectilinearly movable guide between the said wheel and the receiver, and means for limiting the movement of the movable guide.

7. In a winding machine, in combination, a revoluble coil receiver, a double-jointed swinging crane carrying a guiding wheel movable in a line parallel to the axis of revolution of the receiver, and a rectilinearly movable guide between the said wheel and the receiver, said rectilinearly movable guide also being controlled in its movements by the strand being wound.

8. In a winding machine, in combination, a revoluble coil receiver, a double-jointed swinging guiding element controlled in its movements by the strand being wound, a shaft parallel to the axis of rotation of the coil receiver, and a strand guide wheel revolubly mounted on the shaft and turning independently thereof.

9. In a winding machine, in combination, a revoluble coil receiver, a swinging guiding element controlled in its movements by the strand being wound, a shaft parallel to the axis of rotation of the coil receiver, a strand guide wheel revolubly mounted on the shaft and turning independently thereof, and means for revolving the said shaft in a direction opposite to the direction of revolution of the guide wheel.

10. In a winding machine, in combination, a revoluble coil receiver, a double-jointed swinging guiding element controlled in its movements by the strand being wound, a shaft parallel to the axis of rotation of the coil receiver, a strand guide wheel revolubly mounted on the shaft to turn independently thereof, and free to move longitudinally of the shaft.

11. In a winding machine, in combination, a revoluble coil receiver, a double-jointed swinging guiding element controlled in its movements by the strand being wound, a shaft parallel to the axis of rotation of the coil receiver, a strand guide wheel revolubly mounted on the shaft to turn independently thereof, and free to move longitudinally of the shaft, and means for limiting the longitudinal movement of the guide wheel.

12. In a winding machine, in combination, a revoluble coil receiver, a double-jointed swinging guiding element controlled in its movements by the strand being wound, a shaft parallel to the axis of rotation of the coil receiver, a strand guide wheel revolubly mounted on the shaft to turn independently thereof and free to move longitudinally of the shaft, and adjustable means for limiting the longitudinal movement of the guide wheel.

13. In a winding machine, in combination, a revoluble coil receiver, a swinging guiding element controlled in its movements by the strand being wound, a shaft parallel to the axis of rotation of the coil receiver, means whereby the shaft is adjustable toward and away from the coil receiver, a strand guide wheel revolubly mounted on the shaft to turn independently thereof, and means whereby said shaft may be driven in its different positions of adjustment.

14. In a winding machine, the combination, of a revoluble winding member, a reciprocable carriage supported by the material being wound, a cam member engaged by the carriage throughout its reciprocations, a supply mechanism, controlling means for the supply mechanism, said means being operable by the cam member under influence of the carriage.

15. In a winding machine in combination, a revolving coil receiver, a winding guide, a sliding member supported by the material being wound, a supply spool and means for controlling the same, a cam bar for operating the controlling means, said cam bar being arranged to engage the sliding member throughout the movement of the latter.

16. In a winding machine in combination, a revolving coil receiver, a winding guide, a sliding member supported by the material being wound, a cam bar held in contact with the sliding member throughout the sliding movement thereof, a supply mechanism, a retarder therefor, and a connection between the bar and supply mechanism whereby the latter is controlled by the movement of the carriage.

17. In a winding machine, in combination, a revolving coil-receiver, a winding guide, a guide post, a sliding member guided by the guide post and supported by the material being wound, means on said member coöperating with the post to lock the member thereto, said locking means being positively held out of engagement with the post by the material being wound.

18. In a winding machine, in combination, a revolving coil receiver, a winding guide, a guide post, a sliding member on the guide post and supported by the material being wound, means on said member coöperating with the post to lock the member thereto, said locking means being positively held out of engagement with the post by the material being wound, and means for rendering the locking device effective when relieved from the influence of said material.

19. In a winding machine, the combination with a revolving coil receiver, a toothed guide member, a sliding member movable on the guide member and having a pawl adapted to engage teeth on the guide member, a strand guide on the sliding member and a connection between the strand guide and the pawl whereby the strand positively holds the pawl out of engagement with the rack.

20. In a winding machine, the combination with a revolving coil receiver, a toothed guide member, a sliding member movable on the guide member and having a pawl adapted to engage teeth on the guide member, a strand guide on the sliding member and a connection between the strand guide and the pawl for holding the same out of engagement with the toothed member.

21. In a winding machine, the combination with a revolving coil receiver, a toothed guide member, a sliding member movable on the guide member and having a pawl adapted to engage teeth on the guide member, a strand guide on the sliding member and a connection between the strand guide and the pawl for holding the same out of engagement with the toothed member, and a spring to move the pawl into engagement with the toothed member.

22. In a winding machine, a revoluble coil receiver, a supply spool, a sliding member movable by the strand being wound, a member having a plurality of cam faces, means for moving said second member to urge said faces toward the sliding member to be engaged thereby, a retarder and a reversing mechanism for the supply spool, and connections between the said retarder and reversing mechanism whereby the retarder and reversing mechanism are operated by the sliding member moving the cam member by engagement with said cam faces.

23. In a winding machine, a winding mandrel, a supply spool, a brake and a reversing mechanism for the supply spool, a sliding carriage moved by the strand being wound, and a member connected to both the brake and the reversing mechanism engageable by the carriage for first operating the brake and then the reversing mechanism.

24. In a winding machine, a winding mandrel, a supply spool, a brake and a reversing mechanism for the supply spool, a sliding carriage moved by the material being wound, a member connected to the brake and the reversing mechanism, said member having a plurality of surfaces adapted to be engaged by said carriage for controlling the brake and said reversing mechanism.

In testimony whereof I have signed my name to this specification in the presence of two subscribing witnesses.

ARCHIBALD D. SCOTT.

Witnesses:
N. P. HAMILTON,
RAYMOND JOHNSON.

---

Copies of this patent may be obtained for five cents each, by addressing the "Commissioner of Patents, Washington, D. C."

---

Correction in Letters Patent No. 1,047,844.

It is hereby certified that in Letters Patent No. 1,047,844, granted December 17, 1912, upon the application of Archibald D. Scott, of Jersey City, New Jersey, for an improvement in "Winding-Machines," an error appears in the printed specification requiring correction as follows: Page 1, line 93, for the word "hand" read *band;* and that the said Letters Patent should be read with this correction therein that the same may conform to the record of the case in the Patent Office.

Signed and sealed this 21st day of January, A. D., 1913.

[SEAL.]

C. C. BILLINGS,
*Acting Commissioner of Patents.* with a revolving coil receiver, a toothed guide member, a sliding member movable on the guide member and having a pawl adapted to engage teeth on the guide member, a strand guide on the sliding member and a connection between the strand guide and the pawl for holding the same out of engagement with the toothed member, and a spring to move the pawl into engagement with the toothed member.

22. In a winding machine, a revoluble coil receiver, a supply spool, a sliding member movable by the strand being wound, a member having a plurality of cam faces, means for moving said second member to urge said faces toward the sliding member to be engaged thereby, a retarder and a reversing mechanism for the supply spool, and connections between the said retarder and reversing mechanism whereby the retarder and reversing mechanism are operated by the sliding member moving the cam member by engagement with said cam faces.

23. In a winding machine, a winding mandrel, a supply spool, a brake and a reversing mechanism for the supply spool, a sliding carriage moved by the strand being wound, and a member connected to both the brake and the reversing mechanism engageable by the carriage for first operating the brake and then the reversing mechanism.

24. In a winding machine, a winding mandrel, a supply spool, a brake and a reversing mechanism for the supply spool, a sliding carriage moved by the material being wound, a member connected to the brake and the reversing mechanism, said member having a plurality of surfaces adapted to be engaged by said carriage for controlling the brake and said reversing mechanism.

In testimony whereof I have signed my name to this specification in the presence of two subscribing witnesses.

ARCHIBALD D. SCOTT.

Witnesses:
N. P. HAMILTON,
RAYMOND JOHNSON.

---

Copies of this patent may be obtained for five cents each, by addressing the "Commissioner of Patents, Washington, D. C."

---

Correction in Letters Patent No. 1,047,844.

It is hereby certified that in Letters Patent No. 1,047,844, granted December 17, 1912, upon the application of Archibald D. Scott, of Jersey City, New Jersey, for an improvement in "Winding-Machines," an error appears in the printed specification requiring correction as follows: Page 1, line 93, for the word "hand" read *band;* and that the said Letters Patent should be read with this correction therein that the same may conform to the record of the case in the Patent Office.

Signed and sealed this 21st day of January, A. D., 1913.

[SEAL.]

C. C. BILLINGS,
*Acting Commissioner of Patents.*

It is hereby certified that in Letters Patent No. 1,047,844, granted December 17, 1912, upon the application of Archibald D. Scott, of Jersey City, New Jersey, for an improvement in "Winding-Machines," an error appears in the printed specification requiring correction as follows: Page 1, line 93, for the word "hand" read *band;* and that the said Letters Patent should be read with this correction therein that the same may conform to the record of the case in the Patent Office.

Signed and sealed this 21st day of January, A. D., 1913.

[SEAL.]
C. C. BILLINGS,
*Acting Commissioner of Patents.*